United States Patent
Gong et al.

(10) Patent No.: US 7,551,233 B2
(45) Date of Patent: Jun. 23, 2009

(54) IMAGE PROCESSING CIRCUIT HAVING CAPABILITY OF REDUCING DISTORTED/FALSIFIED PHENOMENA OF COLOR COMPONENT OF DECODED VIDEO DATA, AND IMAGE PROCESSING METHOD THEREOF

(75) Inventors: Jin-Sheng Gong, Tao-Yuan Hsien (TW); Chun-Hsing Hsieh, Hsin-Chu (TW)

(73) Assignee: Realtek Semiconductor Corp., HsinChu (TW)

( * ) Notice: Subject to any disclaimer, the term of this patent is extended or adjusted under 35 U.S.C. 154(b) by 715 days.

(21) Appl. No.: 11/163,473

(22) Filed: Oct. 20, 2005

(65) Prior Publication Data

US 2006/0087592 A1    Apr. 27, 2006

(30) Foreign Application Priority Data

Oct. 21, 2004    (TW) .............................. 93132015 A

(51) Int. Cl.
  *H04N 9/77* (2006.01)
  *H04N 11/20* (2006.01)
(52) U.S. Cl. ...................................... 348/663; 348/450
(58) Field of Classification Search ................. 348/663, 348/450, 451, 666; *H04N 9/77, 9/78, 7/01, H04N 11/20*
See application file for complete search history.

(56) References Cited

U.S. PATENT DOCUMENTS

| 4,333,104 A | 6/1982 | Geller |
| 4,862,252 A | 8/1989 | Kuroda |
| 5,161,030 A | 11/1992 | Song |
| 5,543,926 A * | 8/1996 | Ezaki ........................... 348/663 |
| 5,905,839 A * | 5/1999 | Yanagihara et al. ............ 386/26 |
| 6,993,204 B1 * | 1/2006 | Yahil et al. ................... 382/265 |
| 7,095,438 B2 * | 8/2006 | Hayashi ....................... 348/663 |
| 2002/0047930 A1 | 4/2002 | Zhou |

FOREIGN PATENT DOCUMENTS

TW    454423    9/2001

OTHER PUBLICATIONS

Don Munsil and Stacey Spears, "DVD Benchmark—Special Report—The Chroma Upsampling Errorin DVD Players.", Apr. 2001, Secrets of Home Theater & High Fidelity.

* cited by examiner

*Primary Examiner*—Sherrie Hsia
(74) *Attorney, Agent, or Firm*—Winston Hsu

(57) ABSTRACT

An image processing circuit for processing a video signal includes: a separator for separating the video signal into a brightness signal and a color signal; a first filter coupled to the separator for filtering the color signal; and a second filter coupled to the separator for filtering the brightness signal.

19 Claims, 3 Drawing Sheets

IMAGE PROCESSING CIRCUIT HAVING CAPABILITY OF REDUCING DISTORTED/FALSIFIED PHENOMENA OF COLOR COMPONENT OF DECODED VIDEO DATA, AND IMAGE PROCESSING METHOD THEREOF

BACKGROUND OF THE INVENTION

1. Field of the Invention

The present invention relates to image processing, and more particularly, to an image processing circuit and a method thereof.

2. Description of the Prior Art

According to characteristics of human eyes and some assumptions related to photoreception of human eyes, color information recorded in many image compression formats is less than brightness information therein, in order to improve the compression rate of video data with acceptable image quality to human eyes, so the storage or transmission efficiency thereof can be improved. For example, in a video processing procedure of a Digital Versatile Disc (DVD) player, transformations between any two of so-called "4:4:4" format, "4:2:2" format, and "4:2:0" format are involved. In the three formats mentioned above, the "4:4:4" format includes the most color information, and the "4:2:0" format includes the least color information. Therefore, the "4:2:0" format provides the best compression rate in contrast to the other two formats.

The "4:4:4" format mentioned above means: for every four brightness samples Y, there exists four color samples Cb and four color samples Cr corresponding to the four brightness samples Y. In addition, the "4:2:2" format means: for every four brightness samples Y, there exists two color samples Cb and two color samples Cr corresponding to the four brightness samples Y. It is noted that the number of the color samples Cb and the number of the color samples Cr along a horizontal direction of an image frame in the "4:2:2" format are respectively reduced to half of those in the "4:4:4" format. Additionally, the number of the color samples Cb and the number of the color samples Cr in the "4:2:0" format are respectively reduced to half of those in the "4:4:4" format along either a horizontal direction or a vertical direction of an image frame. The relationships between the three formats mentioned above are well known in the art and therefore not explained in detail here.

When an MPEG decoder of the DVD player converts video data of the "4:2:0" format to video data of the "4:2:2" format, additional color samples Cb and Cr should be generated along a vertical direction of an image frame. If the MPEG decoder utilizes a field-decoding method to perform the format conversion mentioned above, errors would easily occur considering a frame composed of an odd field and an even field generated by this format conversion. Please refer to FIG. 1. FIG. 1 illustrates working flows of format conversions respectively utilizing a duplication procedure 120 and an interpolation procedure 140 of the field-decoding method according to the prior art, where the source image 110 can be converted into the duplicated image 130 and the interpolated image 150 respectively through the duplication procedure 120 and the interpolation procedure 140. In FIG. 1, only two pixels are illustrated in each image for the horizontal direction, where different patterns (with different line densities) in these pixels of the images represent different colors. Please note that common boundaries 112 and 114 of objects in the source image 110 are distorted or falsified after the duplication procedure 120 or the interpolation procedure 140, as shown by the duplicated image 130 and the interpolated image 150.

SUMMARY OF THE INVENTION

It is therefore an objective of the claimed invention to provide image processing circuits and methods thereof to solve the above-mentioned problem.

According to a preferred embodiment, the claimed invention provides an image processing circuit for processing a video signal. The image processing circuit comprises: a separator for separating the video signal into a brightness component and a color component; and a first filter coupled to the separator for filtering the color component.

While the image processing circuit mentioned above is provided, the claimed invention correspondingly provides an image processing method for processing a video signal. The image processing method comprises: separating the video signal into a brightness component and a color component; and filtering the color component.

These and other objectives of the claimed invention will no doubt become obvious to those of ordinary skill in the art after reading the following detailed description of the preferred embodiment that is illustrated in the various figures and drawings.

DETAILED DESCRIPTION

Figure 2:
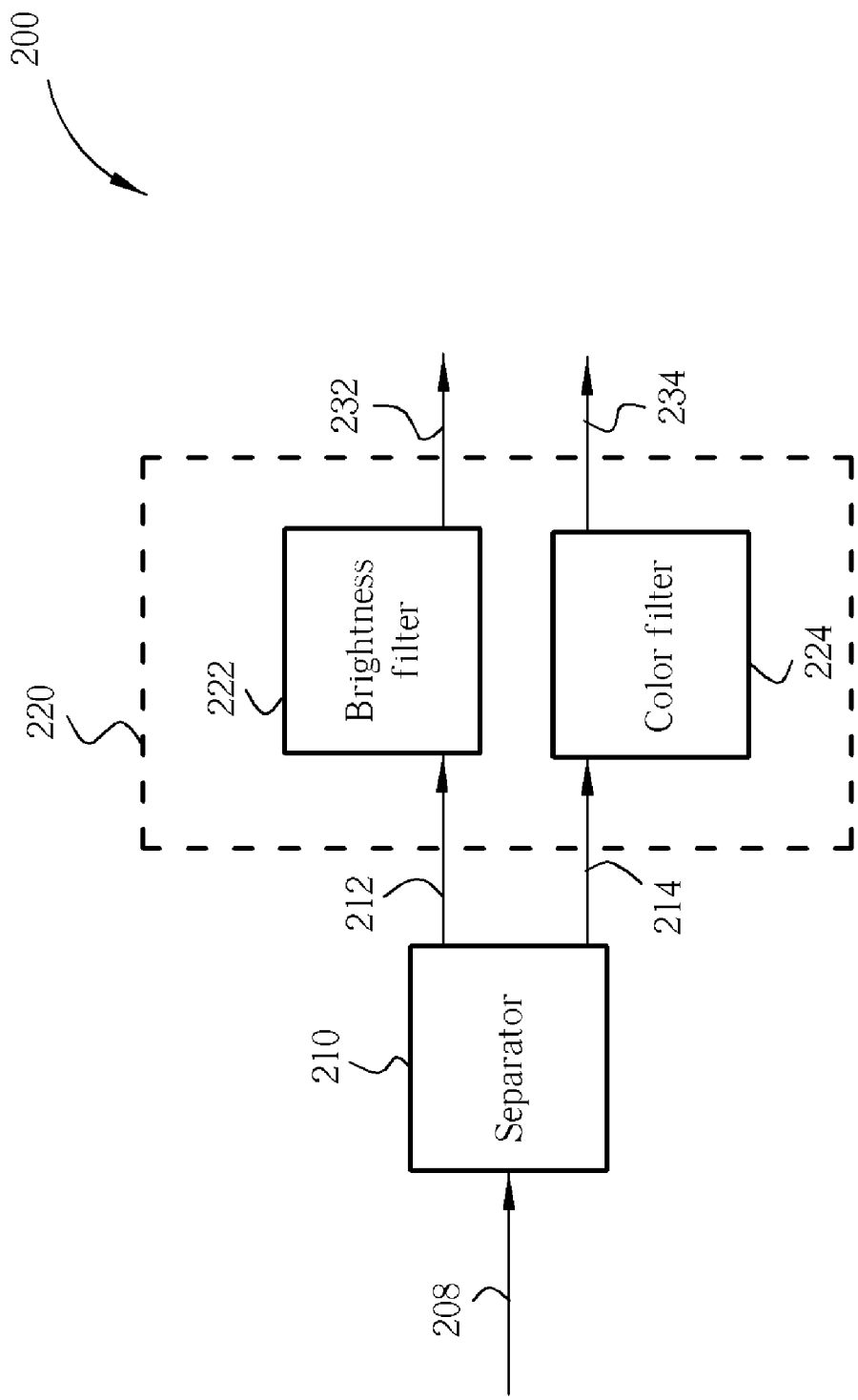
FIG. 2 is a block diagram of an image processing circuit according to one embodiment of the present invention.

Please refer to FIG. 2. FIG. 2 is a block diagram of an image processing circuit 200 according to a first embodiment of the present invention. The image processing circuit 200 comprises a separator 210 (which is a Y/C separator in this embodiment) and a filtering module 220, and the filtering module 220 comprises a brightness filter (Y-F) 222 and a color filter (C-F) 224. According to this embodiment, the image processing circuit 200 is installed in a Digital Versatile Disc (DVD) player and receives a video signal 208 outputted by an MPEG decoder (not shown) thereof. The video signal 208, which is a progressive scan signal in this embodiment, carries a plurality of image frames, where the format of the progressive scan signal and meanings of the image frames thereof are well known in the art and therefore not explained in detail here. As shown in FIG. 2, when receiving the video signal 208, the separator 210 is capable of separating the video signal 208 into a brightness component carried by a brightness signal 212 (which is a Y signal in this embodiment) and a color component carried by a color signal 214 (which is a CbCr signal in this embodiment) according to the format of the image frames, where the brightness component includes brightness samples Y, and the color component includes color samples Cb and Cr. As a result, the brightness samples Y that are originally carried by the video signal 208 are transmitted to the brightness filter 222, and the color samples Cb and Cr that are originally carried by the video signal 208 are transmitted to the color filter 224.

Figure 1:
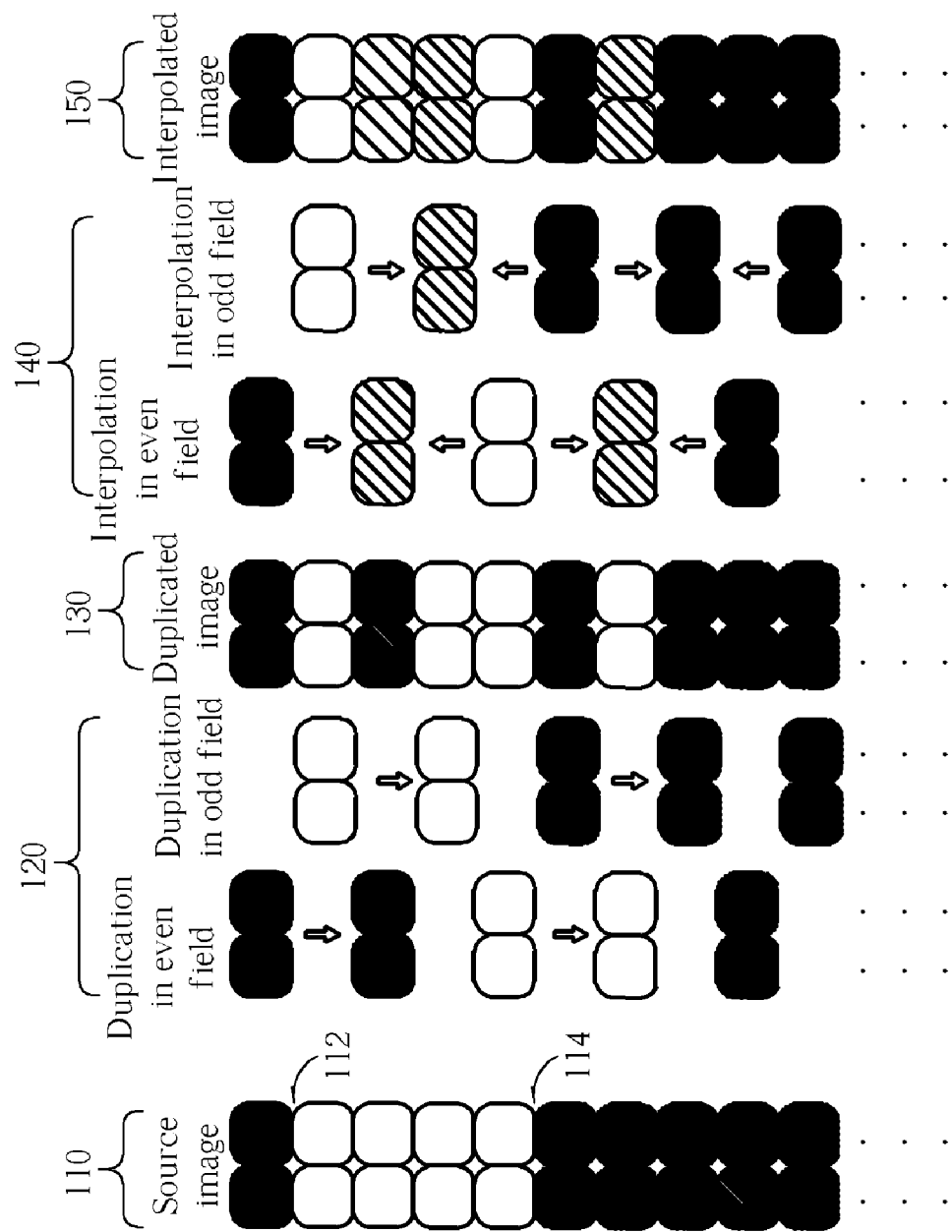
FIG. 1 illustrates working flows of format conversions respectively utilizing a duplication procedure and an interpolation procedure according to the prior art.

In one embodiment, the brightness filter 222 and the color filter 224 are utilized for filtering an image frame under processing along a vertical direction of the image frame. That is, the brightness filter 222 is a vertical brightness filter, and the color filter 224 is a vertical color filter, where the vertical brightness filter and the vertical color filter respectively perform filtering operations with respect to the spatial frequency, and the operation directions thereof are the vertical direction of the image frame under processing. The concepts of spatial frequency are well known in the art and therefore not explained in detail here. After filtering the color signal 214, the color filter 224 generates a filtered color signal 234, which is outputted to an output circuit of the DVD player. In this embodiment, the color filter 224 is a low pass filter (LPF), so color variations at common boundaries between objects of different colors in the image frame under processing are reduced along the vertical direction. As a result, the distorted or falsified phenomena of the duplicated image 130 and the interpolated image 150 shown in FIG. 1 can be reduced or eliminated. In addition, the brightness signal 212 and the color signal 214 are filtered respectively, so the filtering characteristics of the brightness filter 222 can be independently set up by the user without hindering the performance of reducing or eliminating the distorted or falsified phenomena of the duplicated image 130 and the interpolated image 150 by the color filter 224. For example, if the user wants the image frame to be sharpened, the brightness filter 222 can be a high pass filter (HPF) for high-pass-filtering the brightness component to increase sharpness of the image frame; if the user wants the image frame to be smoothed, the brightness filter 222 can be a low pass filter (LPF) for low-pass-filtering the brightness component to decrease sharpness of the image frame; of course, the brightness filter 222 can be set to bypass the brightness signal 212. The filtered brightness signal 232 generated by the brightness filter 222 can also be outputted to the output circuit of the DVD player. As the brightness filter 222 and the color filter 224 may operate independently, brightness variations along the vertical direction in the processed image frame can be sharpened smoothed, or unaltered, and the clarity of the image frame is not influenced by the filtering performed by the color filter 224. Of course, while setting the filtering characteristics of the brightness filter 222, the filtering characteristics of the color filter 224 can be considered to adjust the filtering characteristics of the brightness filter 222, in order to have a combinational outcome, and vice versa.

In a variation of the embodiment shown in FIG. 2, the brightness filter filters the brightness component of an image frame carried by the video signal along at least one predetermined direction of the image frame.

Figure 3:
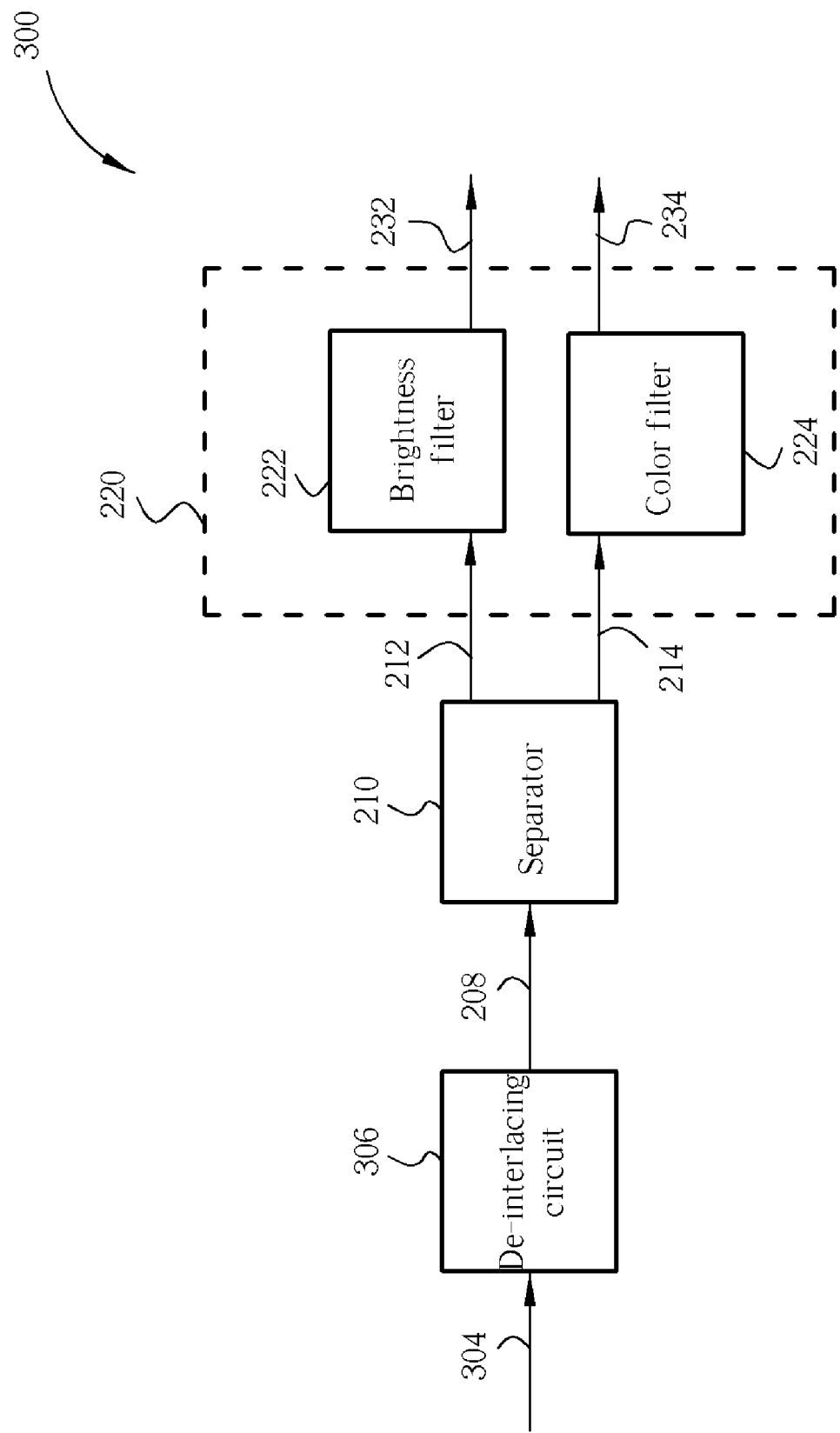
FIG. 3 is a block diagram of an image processing circuit according to another embodiment of the present invention.

Please refer to FIG. 3. FIG. 3 is a block diagram of an image processing circuit 300 according to a second embodiment of the present invention. The second embodiment is similar to the first embodiment, where the differences are described as follows. In addition to the separator 210 and the filtering module 220, the image processing circuit 300 further comprises a de-interlacing circuit 306. According to this embodiment, the image processing circuit 300 is installed in a DVD player and receives a video signal such as an interlaced scan signal 304 outputted by an MPEG decoder (not shown) of the DVD player. The interlaced scan signal 304 corresponds to either an odd field or an even field of an image frame under processing, where the format thereof is well known in the art and therefore not explained in detail here. As shown in FIG. 3, the de-interlacing circuit 306 de-interlaces the interlaced scan signal 304 to generate the video signal 208, i.e. the progressive scan signal mentioned above. Operation principles of the de-interlacing circuit 306 are well known in the art and therefore not explained in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
   a separator for separating decoded video data into a brightness component and a color component; and
   a color low-pass filter (LPF) coupled to the separator for filtering the color component along a predetermined direction of an image frame of the decoded video data with respect to a spatial frequency, in order to reduce distorted phenomena caused by format conversion;
   wherein a video decoder performs the format conversion on compressed video data having a first image format to output the decoded video data having a second image format, and the size of the compressed video data is smaller than that of the decoded video data.

2. The image processing circuit of claim 1, wherein the predetermined direction is a vertical direction.

3. The image processing circuit of claim 1, further comprising:
   a brightness high pass filter (HPF) coupled to the separator for filtering the brightness component along at least one predetermined direction of the image frame of the decoded video data with respect to the spatial frequency, in order to increase sharpness of the image frame.

4. The image processing circuit of claim 3, wherein the color LPF and the brightness HPF operate independently.

5. The image processing circuit of claim 1, further comprising:
   a de-interlacing circuit coupled to the separator for de-interlacing the decoded video data.

6. The image processing circuit of claim 1, wherein when the first image format is a 4:2:0 format, the second image format is a 4:2:2 format or a 4:4:4 format; and when the first image format is a 4:2:2 format, the second image format is a 4:4:4 format.

7. An image processing method, comprising:
   separating decoded video data into a brightness component and a color component;
   respectively receiving the brightness component and the color component; and
   low-pass-filtering the color component along a predetermined direction of an image frame of the decoded video data with respect to a spatial frequency, in order to reduce distorted phenomena caused by format conversion;
   wherein the format conversion is performed on compressed video data having a first image format to output the decoded video data having a second image format, and the size of the compressed video data is smaller than that of the decoded video data.

8. The image processing method of claim 7, wherein the predetermined direction is a vertical direction.

9. The image processing method of claim 7, further comprising:
   high-pass-filtering the brightness component along at least one predetermined direction of the image frame with respect to the spatial frequency to increase sharpness of the image frame.

10. The image processing method of claim 7, further comprising:
low-pass-filtering the brightness component along at least one predetermined direction of the image frame with respect to the spatial frequency to decrease sharpness of the image frame.

11. The image processing method of claim 7, wherein when the first image format is a 4:2:0 format, the second image format is a 4:2:2 format or a 4:4:4 format; and when the first image format is a 4:2:2 format, the second image format is a 4:4:4 format.

12. An image processing circuit, comprising:
a separator for separating decoded video data into a brightness component and a color component, wherein a part of the color component is generated by format conversion;
a first filter coupled to the separator for receiving the color component and filtering the color component with respect to a spatial frequency such that distorted phenomena caused by format conversion are reduced; and
a second filter coupled to the separator for receiving the brightness component and filtering the brightness component with respect to the spatial frequency;
wherein a video decoder performs the format conversion on compressed video data having a first image format to output the decoded video data having a second image format, and the size of the compressed video data is smaller than that of the decoded video data.

13. The image processing circuit of claim 12, wherein the first filter is a low pass filter (LPF).

14. The image processing circuit of claim 13, wherein the first and second filters respectively filter the color component and the brightness component of an image frame of the decoded video data along a vertical direction of the image frame.

15. The image processing circuit of claim 13, wherein the first and second filters operate independently.

16. The image processing circuit of claim 15, wherein the second filter is a low-pass filter (LPF) or a high-pass filter (HPF) or a combination of the LPF and the HPF.

17. The image processing circuit of claim 15, wherein the second filter filters the brightness component of an image frame of the decoded video data along at least one predetermined direction of the image frame.

18. The image processing circuit of claim 15, further comprising:
a de-interlacing circuit coupled to the separator for de-interlacing the decoded video data.

19. The image processing circuit of claim 15, wherein the brightness component and the color component of the decoded video data are carried by a Y signal and a CbCr signal, respectively.

* * * * *